United States Patent
Boes

[15] 3,678,145
[45] July 18, 1972

[54] METHOD FOR PREPARING METAL MATRIX COMPOSITES CONTAINING MODIFIED POLYTETRAFLUOROETHYLENE

[72] Inventor: David J. Boes, Monroeville, Pa.
[73] Assignee: The United States of America as represented by the Secretary of the Air Force
[22] Filed: Dec. 23, 1969
[21] Appl. No.: 887,730

[52] U.S. Cl....................264/115, 75/210, 252/12, 260/92.1 S, 264/122, 264/127, 264/331
[51] Int. Cl...................C08f 3/24, C10m 5/10, F16d 69/00
[58] Field of Search...............264/127, 126, 122, 331, 319, 264/115; 252/12; 260/92.1 S, 96 D; 75/210

[56] References Cited

UNITED STATES PATENTS

| | | | |
|---|---|---|---|
| 3,273,977 | 9/1966 | Davis | 260/92.1 S |
| 2,964,476 | 12/1960 | Coad | 252/12 |
| 2,294,404 | 9/1942 | Hensel et al. | 252/12 |
| 2,933,536 | 4/1960 | Wall et al. | 260/92.1 S |
| 3,432,511 | 3/1969 | Reiling | 260/92.1 S |

*Primary Examiner*—Robert F. White
*Assistant Examiner*—Jeffery R. Thurlow
*Attorney*—Harry A. Herbert, Jr. and Cedric H. Kuhn

[57] ABSTRACT

Polytetrafluoroethylene, sold under the trademark Teflon, is modified before being blended with metal powder and formed into a composite. Modification is accomplished by heating the Teflon for 1 to 2 hours at 1,000°–1,100°F and then for 3 to 3.5 hours at 650° to 750°F. Metal matrix composites containing modified Teflon as a filler are useful as retainer materials for bearings which are subjected to high temperature operating conditions.

2 Claims, No Drawings

METHOD FOR PREPARING METAL MATRIX COMPOSITES CONTAINING MODIFIED POLYTETRAFLUOROETHYLENE

BACKGROUND OF THE INVENTION

1. Field of the Invention

This invention is in the field of solid lubricants.

2. Description of the Prior Art

Self-lubricating composites containing Teflon either as a filler or as the matrix have been used extensively as load bearing surfaces in applications where lubrication by conventional oils and greases is unsatisfactory or impractical. When applied as retainers in otherwise unlubricated ball bearings, composites containing Teflon polymer have provided long term and reliable operation in ultrahigh vacuum environments and at cryogenic temperatures. However, such composites have found little use as retainers in situations where temperatures are high (exceeding about 450°F). This is due to the fact that thermal degradation causes polytetrafluoroethylene-containing composites to lose their high load-bearing capacity and desirable friction-wear characteristics. To achieve greater temperature capabilities, it has been necessary to substitute more thermally stable resins, such as polyimides, for polytetrafluoroethylene. This substitution has affected the ultimate properties of the final product. For example, the substitution of polyimide resin for Teflon in a silver matrix composite causes a twofold increase in friction and more than a tenfold increase in wear under bearing pressures of 500 psi.

In order to eliminate the problem discussed in the preceding paragraph and other problems associated with the use of substitute resins for Teflon, research has been carried out on methods of making Teflon suitable for high temperature use.

SUMMARY OF THE INVENTION

It has now been found that if polytetrafluoroethylene, which is commonly sold commercially under the trademark Teflon, is subjected to heating at about 1,000° to 1,100°F for from 1 to 2 hours and then further heated for at least 3 and preferably not more than 3.5 hours at a temperature of from 650° to 750°F, its high temperature properties are greatly modified. The two heating periods (1,000°–1,100°F for 1 to 2 hours followed by 650°–750°F for 3 to 3.5 hours) may either be carried out with no interruption between (by transferring the molten material from one furnace to another) or by allowing the polytetrafluoroethylene to cool between heating steps. The modification of the high temperature (above about 450°F) properties of the polytetrafluoroethylene results in a product which may be used as filler or as matrix material in high temperature load-bearing composites. The composites hereinafter disclosed have silver or silver/mercury amalgam matrixes with modified polytetrafluoroethylene and molybdenum diselenide as fillers. The composites show greatly improved lifetimes over prior art composites when fabricated into bearing retainers.

DESCRIPTION OF THE PREFERRED EMBODIMENTS

Wear tests performed on self-lubricating composites described in the following examples were made by rubbing a 0.25 inch face with a rotating tool steel disc moving at 2,550 ft/min. A 3-pound load was applied to each test specimen by means of a lever and dead weight assembly to press it against the rotating disc. Wear was observed as scar width in millimeters. Friction was determined at 5-minute intervals by observing the strain gauge deflection on an SR-4 strain indicator as transmitted from a dynamometer attached to the test apparatus. Temperature was monitored with a thermocouple.

EXAMPLE I

Two hundred grams of powdered polytetrafluoroethylene (100 mesh) were placed in a porcelain dish, inserted in a furnace, and heated at a temperature of 1,100°F for 1.5 hours. The material was then removed from the furnace and, still in its molten condition, placed in a second furnace where it was heated for 3 hours at 700°F. During the second heating period, the polytetrafluoroethylene changed color from brownish-grey to pure white. The color change was apparently due to the removal of certain volatile and carbonaceous impurities. When removed from the furnace after the second heating, the polytetrafluoroethylene was in a molten, viscous state. Upon cooling, the modified Teflon was ground in a Wiley mill to a 20–100 mesh particle size.

EXAMPLE II

Polytetrafluoroethylene modified according to example I was blended with silver powder (325 mesh) and molybdenum diselenide powder according to the following proportions.

| Component | Volume % |
|---|---|
| Silver (325 mesh) | 70% |
| Modified Polytetrafluoroethylene | 20% |
| Molybdenum Diselenide | 10% |

After blending, the powdered mixture was charged to a die, compressed under 100,000 psi pressure and brought to a temperature of from 500°–520°F for about 15 minutes. The resulting composite body was capable of being machined, drilled, or threaded and exhibited the following friction-wear characteristics.

| Friction Coefficient | | Wear – mm Scar |
|---|---|---|
| 75°F | 0.01 | 2.5 |
| 600°F | 0.12 | 5.0 |
| 900°F | 0.28 | 9.6 |

Modified polytetrafluoroethylene was further subjected to melting point determinations and, unlike unmodified polytetrafluoroethylene exhibited a sharp melting point at 590°F. When incorporated into a composite in the above-described manner it provided a thin, fluid film of resin on the metal components with which it was in contact. Thus, dynamic friction coefficients and wear of the polytetrafluoroethylene as well as bearing components were reduced by modification of the Teflon.

EXAMPLE III

Polytetrafluoroethylene modified by the method of Example I, silver (325 mesh), and molybdenum diselenide powder were blended according to the following proportions.

| Component | Volume % |
|---|---|
| Silver (325 mesh) | 80% |
| Modified Polytetrafluoroethylene | 5% |
| Molybdenum Diselenide | 15% |

The powder mixture was formed into a composite by heating under compression as described in Example II. Tests on the composite yielded the following results.

| Friction Coefficient | | Wear – mm Scar |
|---|---|---|
| 600°F | 0.09 | 3.5 |
| 900°F | 0.44 | 11.0 |

EXAMPLE IV

A mixture of 70 weight percent silver and 30 weight percent mercury were used as a matrix for modified polytetrafluoroethylene and molybdenum diselenide powder according to the following proportions.

| Component | Volume % |
|---|---|
| 70 wt.% Ag/30 wt.% Hg | 70% |
| Modified Polytetrafluoroethylene | 20% |
| Molybdenum Diselenide | 10% |

Initial wetting of the silver by the mercury was accomplished by blending in a ball-mill. Blending was accomplished by V-blending (as were the blends of Examples I and II). The blend was formed into a composite by compressing in a die at 50,000 psi and 500°–520°F for about 15 minutes. During the composite forming step, the amalgamation of the silver-mercury alloy became complete. The final composites from several repetitions provided pieces having tensile strengths ranging from three to four times those of standard silver matrix composites of identical volume percent composition. Friction-wear measurements yielded the following results.

| Friction Coefficient | | Wear – mm Scar |
|---|---|---|
| 600°F | 0.04 | 4.5 |

The following table presents functional test data from several 204 size ball bearing experiments which provide a comparison between the operating life of bearing systems equipped with retainers using unmodified polytetrafluoroethylene as opposed to those using modified polytetrafluoroethylene. The experiments were performed at 600°F and at a speed of 10,600 rpm. All bearings carried a combined load of 50 lbs. thrust/50 lbs. radial. It will be noted that the bearing systems equipped with silver matrix retainers filled with modified polytetrafluoroethylene provided an improvement in operating life of about 160 percent over identical retainers employing the unmodified polymer. The data also indicate the substantial improvement in life that is realized by using the self-lubricating retainers of this invention in lieu of high temperature grease.

TABLE

FUNCTIONAL 204 SIZE BALL BEARING TESTS COMPARING THE USE OF UNMODIFIED AND MODIFIED PTFE FILLED RETAINERS

600°F - 10,600 rpm - 50 lbs. thrust/50 lbs. radial Retainer Composition: 70% Ag - 20% PTFE - 10% MoSe$_2$ (vol. %)

| Run No. | Polytetrafluoroethylene Type | Life Hrs. |
|---|---|---|
| 1 | Unmodified | 130 |
| 2 | Unmodified | 120 |
| 3 | Unmodified | 127 |
| 4 | Unmodified | 115 |
| 5 | Modified | 340 |
| 6 | Modified | 294 |
| 7 | Modified | 325 |
| 8 | High Temperature Grease | 5 |

EXAMPLE V

The above examples give specific times and temperatures for the modification procedure for polytetrafluoroethylene. Experimentation has shown that the modification steps may be carried out within the time and temperature ranges of from 1 to 2 hours at 1,000° to 1,100°F and from 3 to 3.5 hours at 650° to 750°F without detracting from the excellent high temperature qualities of the final modified polytetrafluoroethylene. Experiments with composites utilizing only modified polytetrafluoroethylene with silver or silver/mercury amalgams in lieu of the three-component systems disclosed gave poor results. However, it is within the scope of the invention to use other solid lubricant powders such as molybdenum disulfide in lieu of the molybdenum diselenide disclosed. Experiments also showed that there is no difference in results if the polytetrafluoroethylene is allowed to cool between the two heating periods of its modification rather than being transferred from one furnace to another while in its molten condition as disclosed in Example I.

I claim:
1. The method of manufacturing a self-lubricating composite article comprising the steps of:
   a. modifying polytetrafluoroethylene by heating it for about 1 to 2 hours at about 1,000° to 1,100°F and thereafter for about 3 to 3.5 hours at about 650° to 750°F;
   b. allowing the modified polytetrafluoroethylene to cool and thereafter grinding it into a powder;
   c. blending a mixture consisting of 15–20 volume percent of the modified polytetrafluoroethylene with 80–70 volume percent silver powder and 15–10 volume percent molybdenum diselenide to form a blended powder mixture; and
   d. forming the blended powder mixture into said composite article by heating said mixture to a temperature of from 500° to 520°F for about 15 minutes while compressing said mixture under a pressure of about 100,000 psi.

2. The method of manufacturing a self-lubricating composite article comprising the steps of:
   a. modifying polytetrafluoroethylene by heating it for about 1 to 2 hours at about 1,000° to 1,100°F and thereafter for about 3 to 3.5 hours at about 650° to 750°F;
   b. allowing the modified polytetrafluoroethylene to cool and thereafter grinding it into a powder;
   c. blending a mixture consisting of 20 volume percent of the modified polytetrafluoroethylene powder and 10 volume percent molybdenum diselenide powder with 70 volume percent of silver-mercury amalgam powder; and
   d. forming the blended powder mixture into said composite article by heating said mixture to a temperature of from 500° to 520°F for about 15 minutes while compressing said mixture under a pressure of about 50,000 psi.

* * * * *